United States Patent [19]

Maclachlan et al.

[11] Patent Number: 4,759,999
[45] Date of Patent: Jul. 26, 1988

[54] SODIUM SULPHUR CELLS AND THEIR MANUFACTURE

[75] Inventors: Stuart Maclachlan, Runcorn; Christopher O. Bell, Great Sankey, both of United Kingdom

[73] Assignee: Chloride Silent Power Limited, Runcorn, United Kingdom

[21] Appl. No.: 9,299

[22] Filed: Jan. 27, 1987

Related U.S. Application Data

[62] Division of Ser. No. 748,933, Jun. 26, 1985, Pat. No. 4,638,555.

[30] Foreign Application Priority Data

Jun. 26, 1984 [GB] United Kingdom ............... 8416228

[51] Int. Cl.$^4$ ..................................... H01M 10/39
[52] U.S. Cl. ............................................. 429/104
[58] Field of Search .................... 429/104, 193, 191

[56] References Cited

U.S. PATENT DOCUMENTS

| | | | |
|---|---|---|---|
| 4,024,321 | 5/1977 | Tilley | 429/104 |
| 4,074,026 | 2/1978 | Bones | 429/104 |
| 4,105,834 | 8/1978 | Baker et al. | 429/104 |
| 4,109,063 | 8/1978 | Dunn | 429/30 |
| 4,419,418 | 12/1983 | Knodler et al. | 429/104 |
| 4,473,624 | 9/1984 | Hug et al. | 429/104 |

FOREIGN PATENT DOCUMENTS

| | | |
|---|---|---|
| 0018190 | 10/1980 | European Pat. Off. . |
| 0064656 | 11/1982 | European Pat. Off. . |
| 0142030 | 5/1985 | Fed. Rep. of Germany . |
| 2102622 | 2/1983 | United Kingdom . |
| 2126774 | 3/1984 | United Kingdom . |

*Primary Examiner*—Anthony Skapars
*Attorney, Agent, or Firm*—Finnegan, Henderson, Farabow, Garrett and Dunner

[57] ABSTRACT

An alkali metal energy conversion device, particularly a sodium sulphur cell has a cylindrical outer casing (18) containing a tubular solid electrolyte (10) of beta alumina. An outer cathode region between the electrolyte (10) and the casing (18) contains sulphur, and an inner anode region in the electrolye tube contains sodium. An alpha alumina lid (12) closes the tube (10) and holds a current collector (15). The cathode region is sealed by an annular metal element (23) which is thermocompression bonded about its inner periphery to the lid (12) and is welded about its outer periphery to the casing (18). A second annular metal element (26) is thermocompression bonded to the lid (12) wholly inside the first annular element (23) and is welded to the current collector. The metal elements (23,26) are bonded to the lid (12) before the lid is glazed to the electrolyte tube (10) and before the first element (23) is welded to the casing (18).

11 Claims, 2 Drawing Sheets

SODIUM SULPHUR CELLS AND THEIR MANUFACTURE

This is a division of application Ser. No. 748,933, filed Jun. 26, 1985, now U.S. Pat. No. 4,638,555.

BACKGROUND OF THE INVENTION

This invention relates to alkali metal energy conversion devices, such as for example alkali metal cells and particularly sodium sulphur cells. Such cells typically employ a solid electrolyte element separating cathodic and anodic reactants which are liquid at the cell operating temperature.

A known construction of device comprises an external casing, a solid electrolyte element dividing the interior of the casing in to two electrode regions, an electrically insulating element joined to the electrolyte element, and at least one metal member sealed to the insulating element. This structure typically forms part of the sealing arrangement for the device, sealing off the two electrode regions both from each other and from the ambient environment. For example, the external casing of the device may be of metal, so that any sealing of an electrode region requires a seal to be made between the metal of the casing and the electrolyte element. However the metal of the casing must be electrically insulated from the electrolyte element and the insulation is provided by the intervening electrically insulating element.

An example of such an arrangement applied to a sodium sulphur cell is shown in GB-A-No. 2102622 which has an alpha alumina lid closing a tubular electrolyte element. A centrally located current collector is mounted in an aperture through the alpha alumina lid and insulated by the lid from the electrolyte element. The outer electrode region, on the outside of the electrolyte element, is sealed by means of a metal closure member welded about its periphery to a metal casing for the cell, and sealed about an inner periphery to the alpha alumina lid. This latter seal between the metal closure member and the alpha alumina lid has hitherto sometimes been made by compression bonding using an intermediate layer, between the metal closure element and the ceramic lid, of a soft material, e.g. aluminium, to provide the necessary bonding.

It will be appreciated that the sealing of sodium sulphur cells and other alkali metal energy conversion devices is of critical importance in the manufacture of the cell to ensure good performance and safety and is a particularly difficult problem because of the high operating temperatures of these cells, typically 350° C. Bonding techniques using cements have not proved practical.

The bonding techniques used hitherto to secure the metal closure element or elements to the insulating element have of necessity been performed after the insulating element is itself joined to the solid electrolyte element. The insulating element is typically a ceramic such as alpha alumina and the solid electrolyte is typically beta alumina. These are joined by glazing at elevated temperatures which would destroy seals between the metal element or elements and the insulating element made by prior art techniques.

This presents certain handling difficulties since the electrolyte element maybe relatively delicate and therefore great care must be exercised when performing compression bonding to the insulating element joined to the electrolyte element. Furthermore, the shape of the composite insulating element and electrolyte element may make it necessary to perform the bonding of the metal elements to the insulating elements individually on a cell by cell basis.

SUMMARY OF THE INVENTION

In one aspect the present invention provides a method of constructing an alkali metal energy conversion device having an external casing, a solid electrolyte element dividing the interior of the casing into two electrode regions, an electrically insulating element joined to the electrolyte element, and at least one metal member sealed to the insulating element, which method includes the steps of securing the metal member directly to the insulating element by thermocompression bonding before joining the insulating element to the electrolyte element.

It has been found that it is possible to produce satisfactory hermetic seals between ceramic materials, particularly alpha alumina, and metal, particularly an iron based or nickel based corrosion reisistant alloy, and that such seals will maintain hermeticity when subject to the temperature stresses arising in a glazing cycle such as may be used for joining the electrolyte element to the insulating element. In seals for sodium sulphur cells using an intermediate aluminium layer, this aluminium layer will not remain as a satisfactory seal when subject to the temperatures (e.g. 1075° C.) required for a glazing operation and hence the sealing of the metal member to the insulating ceramic element has to be effected after the insulating element has been joined to the electrolyte element.

The method of the present invention involves thermocompression bonding of the metal member to the insulating element before this latter is joined to the electrolyte element. The technique of directly thermocompression bonding the metal member to the insulating ceramic element provides a seal between the two which is not adversely effected by subsequent temperature cycling such as may be employed if the insulating element is joined to the electrolyte element by glazing. Furthermore the ability to form the seal between the metal member and the insulating element before the latter is joined to the electrolyte element greatly facilitates the making of this seal. The insulating ceramic element is typically formed of alpha alumina and is quite strong enough to withstand the substantial pressures exerted on it during the thermocompression bonding process. However, the electrolyte element, typically beta alumina is relatively fragile and can easily be damaged during a thermocompression bonding process on an insulating element fastened thereto.

Typically, the aforementioned metal member is thermocompression bonded to the insulating element also before the member is joined to the external casing, typically by welding.

In a preferred example of the method of the invention, each of the metal member and the insulating element are substantially flat and a plurality of said metal members are bonded to respective said insulating elements simultaneously by stacking pairs of said metal member and said insulating elements and applying bonding pressure and heat to the stack.

Conveniently, the metal member may be formed of a nickel based heat resistant alloy containing of the order of 15% chromium and small quantities of other elements. One example of metal member is formed of Inconel 600 alloy which contains principly nickel and 14.7 to 17% chromium, 6 to 10% iron and small quantities of other elements. In another example the metal member is formed of Fecralloy A. Fecralloy A is an iron based alloy typically containing about 15.8% chromium and 4.8% aluminium with a small quantity of yttrium. This alloy under oxidising conditions forms a tenacious and stable alumina coating which is keyed to the matrix by preferential grain boundary oxidation caused by the yttrium addition.

In a typical form, the external casing is cylindrical, the electrolyte element is tubular and the metal is annular with a central openning through which extends, insulatingly spaced from the metal member, a current collector.

Preferably, the annular metal member is secured, by the thermocompression bonding, to the insulating element in a narrow annular region at or near the inner periphery of the annular metal member. The pressure to produce bonding in this region is preferably applied through an annular metal washer of a material which becomes bonded to said annular metal member. The washer forms a backing element giving a stronger joint whilst permitting the assembly to be more flexible since the joint remains rigid even if the remaining part of the annular member is flexed slightly.

In the manufacture of a sodium sulphur cell, after the annular metal member has been secured to the insulating ceramic element and the electrolyte element has subsequently been joined to the insulating element, the external casing is welded around its periphery at one end thereof to the annular metal member.

Normally, the insulating element is a disc shaped lid for the tubular electrolyte element and then an inner metal element may be secured to the lid by thermocompression bonding to provide a metal element for sealing around the current collector which is subsequently inserted through the inner metal element and through an aperture in the lid. This bonding of the inner metal element to the lid may take place at the same time as the bonding of the aforesaid annular metal member. Further, the pressure to produce bonding of this inner metal element to the lid may be applied also through an annular metal backing element of a material which becomes bonded to said inner metal member.

Preferably said inner metal element is formed as a flat annular sheet having an outer diameter which is less than the inner diameter of the aforesaid annular metal member and the inner metal element is thermocompression bonded to the lid about its outer periphery only. Preferably also, a metal strengthening washer is bonded to the inner metal element adjacent its inner periphery, the outer diameter of the washer being less than the diameter at which the inner metal element is sealed to the lid, and the current collector is sealed in electrical connection to the strengthening washer. This construction permits some flexing of the inner metal element between where it is sealed to the current collector and where it is bonded to the ceramic lid.

The invention further includes within its scope an alkali metal energy conversion device having an external casing, a solid electrolyte element in the casing to divide the interior into two electrode regions, an electrically insulating element joined to the electrolyte element, and a metal member joined to the external casing and secured by thermocompression bonding directly to the insulating member to seal off one of said electrode regions.

It should be noted that the term glazing, used herein to refer to a preferred method of joining the insulating element to the electrolyte element, is intended to cover any technique for bonding together two normally ceramic parts by applying a molten electrically insulating substance at high temperature which forms a rigid bond on cooling. In particular, glazing covers forming the bond with both non-crystalline glass and crystalline glass-like substances.

BRIEF DESCRIPTION OF THE DRAWINGS

Examples of the invention are described with reference to the accompanying drawings in which.

DETAILED DESCRIPTION OF THE EMBODIMENTS

Figure 1:
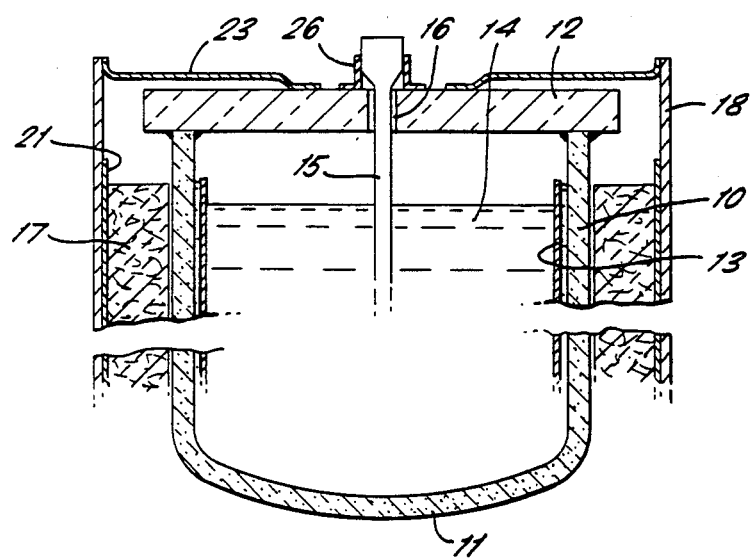
FIGS. 1 and 2 are each a diagrammatic longitudinal cross section through a sodium sulphur cell.

Referring to FIG. 1 of the drawings, a sodium sulphur cell of the central sodium type is illustrated comprising a cylindrical beta alumina electrolyte tubular element 10 which is integrally closed at one end as shown at 11 and has its other end closed by an alpha alumina end plate 12. The end plate 12 is sealed, as described later, by glazing to one end of the electrolyte element 10 and forms electrical insulation as well as a mechanical seal. Within the sealed assembly there may be an iron foil element 13 closely adjacent the inner cylindrical surface of the electrolyte tube 10 to leave a capillary region adjacent that surface constituting a wick. The interior of the assembly is filled with sodium 14 which is liquid at the operating temperature of the cell; the capillary maintains a layer of liquid sodium over the inner surface of the electrolyte tube 10. A current collector rod 15 extends into this sodium, passing through an aperture 16 in the alpha aluminia element 12. Around the outside of the cylindrical portion of the electrolyte element 10 is a cathode structure of annular form constituted by two semi-cylindrical elements 17 of carbon fibre material impregnated with sulphur. These elements lie between the electrolyte tube 10 and an outer metal case 18, the cathode elements 17 being in contact both with the beta alumina electrolyte tube 10 and the case 18. These cathode elements may be formed in the known way by compression of the fibre material which is impregnated with hot sulphur, the sulphur then being cooled so as to be solidified and thereby to hold the element in compression to facilitate assembly of the cell. When the cell is raised to the operating temperature, typically 350° C., the sulphur melts and the resilience of the fibre material causes the elements 17 to make good contact with the case 18 and the electrolyte 10. The case 18 is made preferably of Inconel 600 or chromised mild steel and, on its internal surface, is coated with an anti-corrosive electronically conductive coating 21 to provide an electronically conductive path between the case and the carbon fibre material.

The present invention is concerned more particularly with the sealing at the end of the cell and with the method of construction of the cell. The alpha alumina plate 12 is formed as a disc with a central aperture 16. This disc is sealed to the case 18 by means of an annular metal member 23 formed of Inconel 600 or Fecralloy A which is secured by welding to the periphery of the housing and by thermocompression bonding to the disc 12 in an annular region around the central aperture 16. The central compartment of the cell is closed by means of a current collector 15 passing through the aperture 16 and secured to an inner metal element 26 also bonded to the alpha alumina around the aperture 16 by means of thermocompression bonding. This element 26 is spaced radially inwardly from the annular metal member 23 so that they are electrically insulated from one another by the alpha alumina.

In the manufacture of the cell, the metal members 23 and 26 are bonded to the alpha alumina end plate 12 before further assembly in the cell. This bonding is effected by compression at an elevated temperature and under vacuum conditions or in an inert atmosphere. Typical bonding conditions for 0.075 mm (3 thou) thick Fecralloy metal members are:

Maximum Bonding Temperature=1000° C.
Time at Maximum Temperature=20 mins
Bonding Pressure=24.5 $Nmm^2$
Bonding Chamber Vacuum=4 $\times 10^{-2}$ torr The inner metal member 26 is of relatively small radial extent and the seal is effected over the whole surface area of member 26 that is in contact with the alpha alumina disc. The outer annular metal member 23 is sealed to the alpha alumina over a small annular region around the inner member but slightly spaced therefrom.

Using this technique, a plurality of sub-assemblies comprising the end plates 12 with their metal members can be stacked and produced in a single operation, the sub-assemblies in the stack being separated during the thermocompression bonding operation by aluminium fiber washers.

After the sub-assembly has been formed in this way the electrolyte tube may be glazed to the alpha alumina since the seals remain satisfactory even when subjected to the thermal changes of a glazing cycle which might typically require heating from room temperature to 1075° C. and subsequent cooling. After the electrolyte tube is in position, the cathode structure may then be put around the electrolyte tube and assembled in the housing which is welded to the member 23. The inner part of the cell may then be filled with sodium and sealed after inserting the anode current collector.

Figure 2:
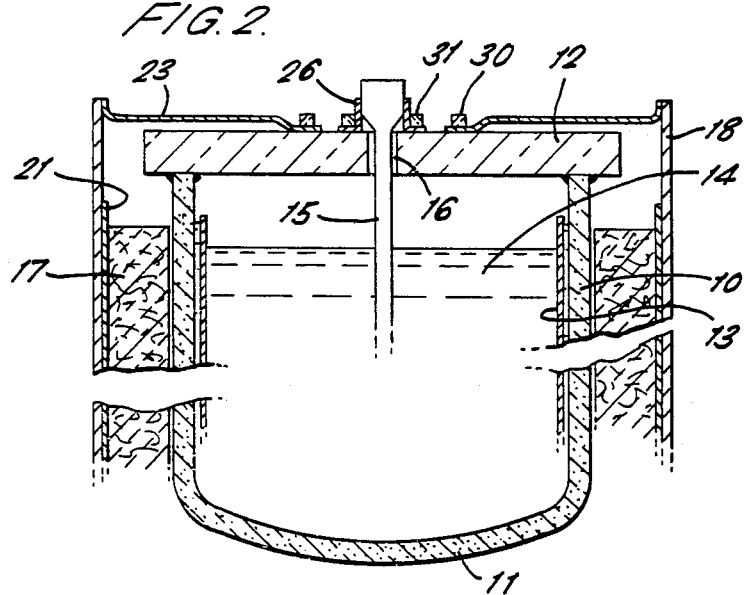

FIG. 2 illustrates a modification of the arrangement of FIG. 1 and, in the following description, mention will only be made of the distinctive features. The same reference numerals are used to indicate corresponding components.

In FIG. 2, there is shown a backing washer 30 which is typically formed of Fecralloy A or Telcoseal. Telcoseal is the name used for a family of alloys with thermal expansion coefficients matched to glass and a typical composition is, by weight, 17% Co, 29% Ni, and 54% Fe. Such materials will bond to the annular metal member 23, which is sandwiched between the alpha alumina element 12 and the backing washer 30, when the thermocompression bonding pressure is applied to the assembly. The resultant seal, compared with the structure of FIG. 1 without a backing washer, is stronger and is more flexible in that slight flexing of the member 23 is possible in the region outside the bond whilst the bonded portion is held rigidly by the backing washer 30.

Similarly, the inner seal in FIG. 2 is provided with a backing washer 31, typically also formed of Fecralloy or Telcoseal, thereby giving (compared with the arrangement of FIG. 1) a stronger seal and permitting of a more flexible construction. The bonding is effected by thermocompression under a vacuum or in an inert atmosphere, as in the arrangement of FIG. 1, but with the inner seal member 26 sandwiched between the backing washer 31 and the alpha alumina end plate 12.

Figure 3:
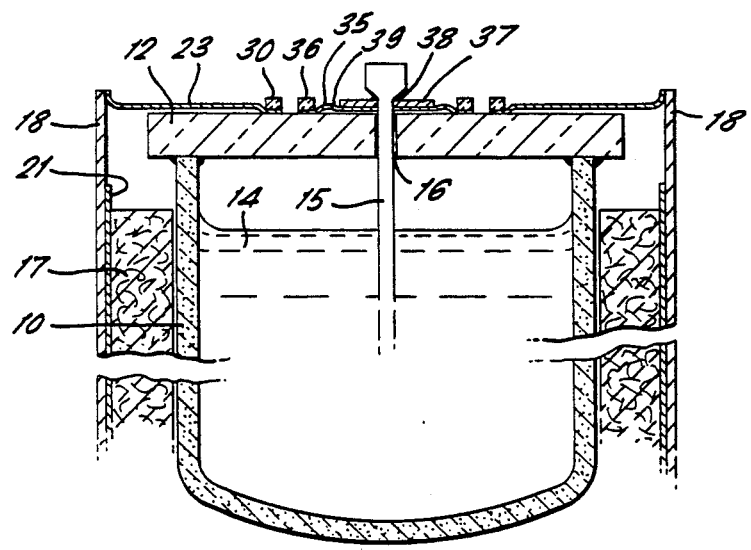
FIG. 3 is a further diagrammatic cross section of an alternative construction of the sealing arrangement of a sodium sulphur cell.

FIG. 3 illustrates a further embodiment of the invention which provides for certain advantages when constructing the cell. In FIG. 3, elements similar to those described previously with reference to FIGS. 1 and 2 are given the same reference numbers. The primary difference in the construction of FIG. 3 is in the shape of the inner metal element, identified 35 in FIG. 3. The inner metal element 35 is formed as a substantially flat and thin annular sheet having an outer diameter which is somewhat less than the inner diameter of the annular metal member 23, and a central hole corresponding to the aperture 16 through the alpha alumina end plate 12. The annular sheet 35 is thermocompression bonded around its outer periphery only to the alpha alumina plate 12. In the thermocompression bonding process, a backing washer 36 is employed to apply the necessary pressure, in the same way as backing washer 30 is used for sealing the inner peripheral edge of the annular member 23.

A strengthening washer 37 is also thermocompression bonded to the upper surface of the annular sheet 35. The strengthening washer 37 has a thickness greater than the thickness of the sheet 35 and serves to keep the inner peripheral portion of the sheet 35 substantially rigid. The outer diameter of the washer 37 is substantially less than the diameter of the backing washer 36, corresponding to the position of the seal between the sheet 35 and the alpha alumina plate 12.

The central current collector 15 extending through the aperture 16 has an annular shoulder 38 which seats against the inner edge of the strengthening washer 37 and is welded thereto to provide the necessary hermetic seal.

Because the annular sheet 35 is bonded to the alpha alumina plate 12 only about the outer periphery of the sheet 35, some flexibility is provided between the seal with the central current collector and the seal with the plate 12. The material of the sheet 35 is made sufficiently thin to permit some distortion in the region 39 between the backing washer 36 and the strengthening washer 37.

A primary advantage of the embodiment shown in FIG. 3 is that a plurality of sub-assemblies comprising the end plates 12 with their metal members can more easily be stacked up for thermocompression bonding in a single operation. With the embodiment of FIG. 2, some spacing arrangement is necessary to provide space between successive end plates in a stack of sub-assemblies to accommodate the upright cylindrical flanges of the inner metal elements 26. Alternatively, it is necessary to rebate the under surface of each end plate 12 to accommodate these flanges. This problem does not arise with the embodiment of FIG. 3, in which the strengthening washer 37 is made less thick than the backing washers 30 and 36 so that sub-assemblies can be stacked and pressed together with all the pressure being transferred via the backing washers.

In one particular example, the inner annular sheet 35 and also the annular metal member 23 are formed of foil about 0.15 mm thick. The strengthening washer 37 is 0.5 mm thick and the backing washers 30 and 36 are both 0.75 mm thick.

The various metal components may be of Inconel 600 or Fecralloy A. In one example, both the strengthening washer 37 and the inner annular sheet 35 are of Inconel 600. The cell is then formed by the following process steps.

Firstly the strengthening washer 37 is thermocompression bonded to the inner annular sheet 35. This causes an oxide layer to be formed on the exposed surfaces of the Inconel components which must be removed to permit these components to be bonded to the alpha alumina plate 12. The oxide layer is removed by grit blasting.

Next the backing washer 36 is tack welded in place on the inner annular sheet 35 and the backing washer 30 is tack welded in place on the annular metal element 23. The tack welding is just sufficient to hold the backing washers in place whilst the various elements are handled ready for final bonding together.

The inner annular sheet 35 with its attached and bonded backing washer 36 and strengthening washer 37 is then offered up to the end plate 12, together with the outer annular element 23 to which has been also tacked the backing washer 30. A stack of these sub-assemblies may be prepared with layers of alumina fibres between each sub-assembly to prevent one sub-assembly bonding to the next. The complete stack is then axially compressed to provide the necessary bonding pressure and heated to the bonding temperature in an appropriate vacuum or inert atmosphere.

The bonded sub-assemblies may then each be glazed to close the open end of a respective electrolyte tube and used in the assembly of the complete sodium sulphur cell with the annular sulphur filler elements 17 between the electrolyte tube 10 and the outer metal case 18. The outer peripheral edge of the annular element 23 is welded to the open end of the case 18 to seal the cathode region. Finally, the necessary sodium fill is introduced through the aperture 16 of the plate 12 whereupon the anode region is sealed by inserting the current collector 15 and welding this to the strengthening washer 37.

In another arrangement, Fecralloy A is used for the annular metal sheet 35 instead of Inconel 600. The strengthening washer 37 may still be of Inconel 600.

Then the strengthening washer 37 is also resistance tack welded to the annular sheet 35 prior to the whole sub-assembly, comprising the end plate 12, the outer annular member 23 with its backing washer 30, and the inner annular sheet 35 with its backing washer 36 and strengthening washer 37 is assembled in the thermocompression bonding jig. The strengthening washer 37 is then thermocompression bonded to the annular sheet 35 simultaneously with the bonding of the sheet 35 and the metal element 23 to the end plate 12. This simultaneous bonding is necessary because the thermocompression bonding procedure causes an oxide to be formed on the Fecralloy A which is very tenacious and cannot readily be removed by grit blasting. Thus, it is not possible to thermocompression bond the strengthening washer 37 to the sheet 35 prior to bonding the sheet 35 to the plate 12, because the presence of this oxide layer would prevent a good bond being formed with the alpha alumina plate.

In order to prevent the sheet 35 bonding with the alpha alumina plate 12 under the strengthening washer 37, a mat of alumina fibres are provided in this region between the sheet 35 and the plate 12 before thermocompression bonding.

Furthermore, it is desirable to press a couple of circular corrugations in the sheet 35 in the region to be bonded to the strengthening washer 37 to increase the effective thickness of the sheet 35 in the region of the strengthening washer.

Although, in the above, the cell has been more particularly described as of the central sodium type, it will be apparent that the method of construction and the sealing technique is equally applicable to cells of the central sulphur type.

The above description has dealt particularly with a sodium sulphur cell embodying the invention. The invention is applicable also to other alkali metal energy conversion devices which employ a solid electrolyte between two regions which become anodic and cathodic respectively in operation of the device.

We claim:

1. An alkali metal energy conversion device having an external casing, a solid electrolyte element in the casing to divide the interior into two electrode regions;
   an electrically insulating ceramic element joined to the electrolyte element,
   and a metal member having a melting point above about 1075° C., said member being joined to the external casing and secured by a direct thermocompression bond to the insulating ceramic element to seal off one of said electrode regions, said direct thermocompression bond being resistant to temperatures up to about 1075° C.

2. A device as claimed in claim 1 wherein the metal member is formed of Inconel 600.

3. A device as claimed in claim 1 wherein the metal member is formed of Fecralloy A.

4. A device as claimed in claim 1 constituting a sodium sulphur cell wherein the cell is cylindrical, the electrolyte element is tubular, and the metal member is annular having a central opening through which extends, insulatingly spaced from the metal member, a current collector.

5. A sodium sulphur cell as claimed in claim 4, wherein said annular metal member is thermocompression bonded to the insulating ceramic element in a narrow region at or near the inner periphery of the annular metal member.

6. A sodium sulphur cell as claimed in claim 4 wherein the annular metal member is sandwiched between a metal backing washer and the insulating ceramic element, being thermocompression bonded to both in an annular region.

7. A sodium sulphur cell as claimed of claim 4 wherein the insulating ceramic element is a disc shaped lid for the tubular electrolyte element with an aperture receiving the current collector, and there is an inner metal element secured to the lid by thermocompression bonding around the aperture and which is sealed to the current collector.

8. A sodium sulphur cell as claimed in claim 7 wherein the inner metal element is sandwiched between a further metal backing washer and the insulating ceramic element, being thermocompression bonded to in an annular region.

9. A sodium sulphur cell as claimed in claim 2 wherein said inner metal element is formed as a flat annular sheet having an outer diameter which is less than the inner diameter of the aforesaid annular metal member and the inner metal element is thermocompression bonded to the lid about its outer periphery only.

10. A sodium sulphur cell as claimed in claim 9 and having a metal strengthening washer bonded to the inner metal element adjacent its inner periphery, the outer diameter of the washer being less than the diameter at which the inner metal element is sealed to the lid, and the current collector is sealed in electrical connection to the strengthening washer.

11. A sodium sulphur cell having a cylindrical electrolyte tube glazed to an alpha alumina element extending across one end of the electrolyte tube and with an annular metal member of a corrosion-resistant iron based or nickel based alloy secured by a direct thermocompression bond to the alpha alumina element and welded to the periphery of an outer metal housing surrounding the electrolyte element, said direct thermocompression bond being resistant to temperatures up to about 1075° C.

* * * * *